(No Model.)

B. B. BYRNSIDE.
TOBACCO HANGER.

No. 478,153. Patented July 5, 1892.

Witnesses
Frank H. Thatcher
Wm G Griffin

Inventor
Benjamin B. Byrnside
By Patrick O'Farrell
Attorney

THE NORRIS PETERS CO., PHOTO-LITHO., WASHINGTON, D. C.

UNITED STATES PATENT OFFICE.

BENJAMIN B. BYRNSIDE, OF CLIFTY, WEST VIRGINIA.

TOBACCO-HANGER.

SPECIFICATION forming part of Letters Patent No. 478,153, dated July 5, 1892.

Application filed January 4, 1892. Serial No. 417,006. (No model.)

*To all whom it may concern:*

Be it known that I, BENJAMIN B. BYRNSIDE, a citizen of the United States of America, residing at Clifty, in the county of Fayette and State of West Virginia, have invented certain new and useful Improvements in Tobacco-Hangers, of which the following is a specification, reference being had therein to the accompanying drawings.

My invention relates to tobacco-hangers; and it consists in forming the hanger of an integral piece, the edges of which are provided with oblique slots made wider upon one face of the hanger than upon the other.

The object of my invention is to form a tobacco-hanger upon which the greatest number of plants can be placed without crowding, so that the air may circulate freely between the plants, causing them to be better, more uniformly, and quickly cured.

My invention is illustrated in the accompanying drawings, in which—

Figure 1:
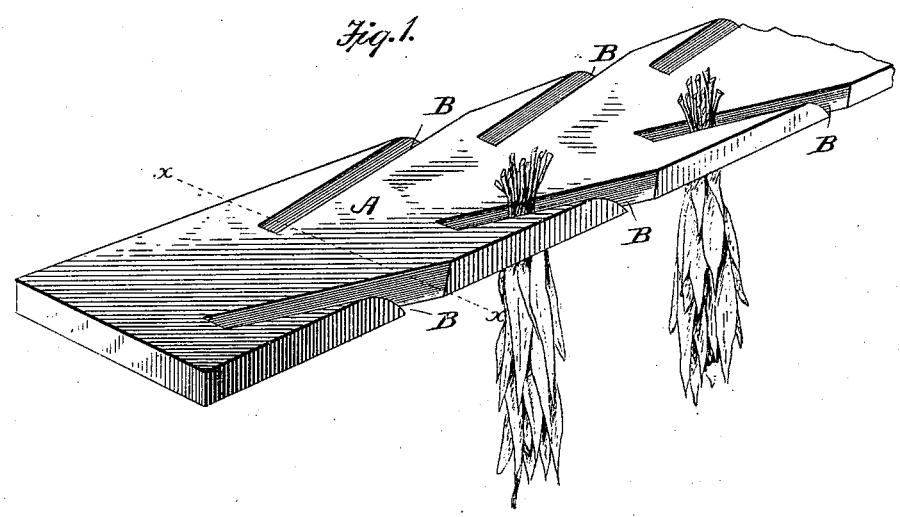
Figure 2:
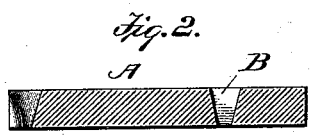

Figure 1 is a perspective view showing the hanger as it will appear when in use with some plants inserted in the slots. Fig. 2 is a cross-section taken on the line $x\,x$ of Fig. 1, showing the form of the slot.

Referring to the drawings, A indicates a lath or narrow board, preferably of wood, but any suitable material may be used, into the edges of which is cut or formed a series of oblique slots B. These slots are made wider upon one face than upon the other, and those in one edge are located so they will terminate opposite, or approximately so, to the entrance of the slots in the opposite edge. In this way the plants inserted in the slots are separated to the greatest advantage. The form of the slots admits of the ready insertion and removal of the plants and prevents them from falling out at any stage of the curing process. The drying and consequent shrinkage of the plants does not cause them to adhere to the hanger, as is the case when sharp instruments—such as wires, pins, &c—are caused to pierce the stems to suspend them.

Having thus described my invention, what I claim as new, and desire to secure by Letters Patent, is—

1. A tobacco-hanger made of an integral piece and provided on its opposite edges with oblique slots, said slots being wider upon one face than upon the other and the slots from one edge terminating inwardly opposite the entrance of the slots in the opposite edge, substantially as described.

2. A tobacco-hanger formed of an integral piece and provided with oblique slots, said slots being wider upon one face than upon the other, substantially as described.

In testimony whereof I affix my signature in presence of two witnesses.

BENJAMIN B. BYRNSIDE.

Witnesses:
J. W. LEGG,
A. BLAKE.